United States Patent [19]

Reedy

[11] Patent Number: 5,120,005
[45] Date of Patent: Jun. 9, 1992

[54] EXHAUST FLAP SPEEDBRAKE

[75] Inventor: David V. Reedy, Cincinnati, Ohio

[73] Assignee: General Electric Company, Cincinnati, Ohio

[21] Appl. No.: 582,319

[22] Filed: Sep. 14, 1990

[51] Int. Cl.[5] .......................... B64C 9/32; B64C 15/00
[52] U.S. Cl. .............................. 244/113; 244/110 R; 239/265.41; 239/265.39; 60/228
[58] Field of Search .......... 244/110 R, 110 A, 110 D, 244/110 B, 12.5, 213, 215, 217, 113; 60/226.1, 226.2, 228, 230, 242, 694; 239/265.39, 265.33, 503, 127.3, 507, 265.41

[56] References Cited

U.S. PATENT DOCUMENTS

| 2,926,491 | 3/1960 | Hyde | 239/265.41 |
|---|---|---|---|
| 3,248,878 | 5/1966 | Clark et al. | 244/110 B |
| 3,353,355 | 11/1967 | Jordan | 244/113 |
| 3,386,247 | 6/1968 | Gross et al. | |
| 3,981,450 | 9/1976 | McCardle, Jr. et al. | 244/110 B X |
| 4,003,533 | 1/1977 | Carter et al. | 244/110 D X |
| 4,093,122 | 6/1978 | Linderman et al. | 244/12.5 X |
| 4,132,068 | 1/1979 | Johnston | |
| 4,793,134 | 12/1988 | Coplin et al. | 60/226.1 |
| 4,819,876 | 4/1989 | Thayer | 239/265.39 |
| 4,828,173 | 5/1989 | Guerty | 244/110 B X |

Primary Examiner—Joseph F. Peters, Jr.
Assistant Examiner—Carla Mattix
Attorney, Agent, or Firm—Jerome C. Squillaro; David L. Narciso

[57] ABSTRACT

An aircraft speedbrake is integrated into a jet engine exhaust nozzle. A first set of nozzle flaps which are normally out of the airstream, are extended into the airstream to create drag on the airframe and thereby act as speedbrakes. A second set of nozzle flaps are opened when the first set of nozzle flaps are extended into the airstream, to simultaneously spoil the thrust of the engine.

8 Claims, 4 Drawing Sheets

EXHAUST FLAP SPEEDBRAKE

BACKGROUND OF THE INVENTION

This invention relates to aircraft speedbrakes which are moved to extend into the airstream to increase drag on an aircraft. In particular, this invention uses an exhaust nozzle flap to serve as a speedbrake. As the flap is moved into the airstream, the engine thrust is concurrently spoiled to increase the braking of the aircraft.

Currently many aircraft use flaps which are extended into the airstream as speedbrakes. In commercial aircraft, the flaps are often mounted on the upper surfaces of the wings and lie flush with the wings when not in use. In order to slow down the aircraft, the flaps are extended upwardly from the wing surfaces into the airstream to increase drag on the aircraft.

In military aircraft, the flaps which act as speedbrakes are usually mounted on the airframe. When not in use the flaps lie flush with the surface of the airframe on which they are mounted so as to not cause unnecessary drag on the aircraft. In order to slow down the aircraft or create drag for inflight maneuvers, the flaps are extended into the airstream.

The movement of the flaps which act as speedbrakes, into the airstream is currently independent of the engine controlling flaps. In particular, the movement of the speedbrake flaps does not cause a spoiling of the thrust of the engine.

Modern jet aircraft engines are gas turbine engines which pass combustion discharge gases to the atmosphere at a velocity, and in the required direction, to provide a desired resultant thrust. The exhaust nozzle of the engine has as its purpose the transformation of the pressure and the thermal energy of the combustion discharge or exhaust gases into velocity and thrust.

Exhaust nozzles may be of a variety of types, e.g., fixed area, variable area, convergent, and convergent-divergent. A fixed areas nozzle is only efficient over a narrow range of engine operating conditions. The area of the nozzle is critical, since it affects the backpressure on the turbine and hence the rpm, thrust, and exhaust gas temperature.

Variable area nozzles are often used to maintain a high engine performance under a variety of operating conditions, i.e. the correct balance of pressure and temperature at all operating conditions. In engines with afterburners, variable area nozzles are required. The area of an afterburning jet pipe is larger than a normal jet pipe for the same engine. The nozzle is narrowed when the afterburners are off and is opened when the afterburners are on to give an exit area suitable for the increased volume of the gas stream.

Convergent nozzles are designed to maintain a constant internal pressure and still produce sonic velocities at the nozzle exit. In this type of nozzle the gas flow is subsonic as it leaves the turbine. In a convergent nozzle, the gas velocity cannot exceed the speed of sound. In order for the gas to exceed the speed of sound, a convergent-divergent nozzle must be used. In the diverging section, the speed of the gas is increased to supersonic speed by increasing the gas volume outwardly and rearwardly while controlling the direction of the gas expansion.

Variable area nozzles have used a variety of flaps at the exit ends of the nozzles to vary the exit areas. One example of flaps for varying the area of exit from a convergent nozzle is shown in U.S. Pat. No. 3,386,247, issued Jun. 4, 1968 to the assignee of the present invention, for a "Powerplant with Thrust Reversers". Hinged flaps are provided which are moved toward and away from the centerline of the engine to vary the nozzle area. The flaps are opened to spoil the thrust of the engine during thrust reversal, but are not used as speedbrakes, nor do they spoil the thrust in flight.

If the functions of the flaps which act as speedbrakes can be combined with the functions of the flaps which control the exhaust nozzle, this would be a beneficial improvement. This improvement would be particularly beneficial if activation of the speedbrakes also acts to spoil the thrust of the engine simultaneously.

SUMMARY OF THE INVENTION

Accordingly, it is an object of the present invention to provide a means for slowing down an aircraft, which also controls an exhaust nozzle.

A further object of the present invention is to provide a means for slowing down an aircraft, which also spoils the thrust of the engine.

A further object of the present invention is to provide exhaust flaps which may be moved into the airstream to act as speedbrakes.

A still further object of the present invention is to provide exhaust flaps which when moved into the airstream act as speedbrakes and simultaneously cause the spoiling of the thrust.

Another object of the present invention is to provide a first array of exhaust flaps which are linked to a second array of exhaust flaps so that when the first flaps act as speedbrakes, the second flaps spoil the thrust of the engine.

Still another object of the present invention is to provide speedbrakes integrated into the exhaust flaps, thereby eliminating airframe mounted speedbrakes to reduce the weight of the airframe.

A further object of the present invention is to provide speedbraking and thrust spoiling simultaneously without changing the engine operating conditions through the use of an exhaust flap system.

A still further object of the present invention is to provide speedbraking and thrust spoiling simultaneously while maintaining the engine operating conditions by using exhaust flaps aft of the choke point of the nozzle to spoil the thrust while maintaining sonic gas velocity at the choke point.

Briefly, in accordance with a preferred embodiment of the present invention there is provided a variable area nozzle with outer flaps which may be moved outward into the airstream to act as speedbrakes. The outer flaps are connected to divergent flaps so that as the outer flaps are moved into the airstream, the divergent flaps are moved outwardly to spoil the thrust of the engine.

The aforementioned objects, features and advantages of the invention, will, in part, be pointed out with particularity, and will, in part, become obvious from the following more detailed description of the invention taken, in part, with the drawings which form an integral part thereof.

Figure 1:
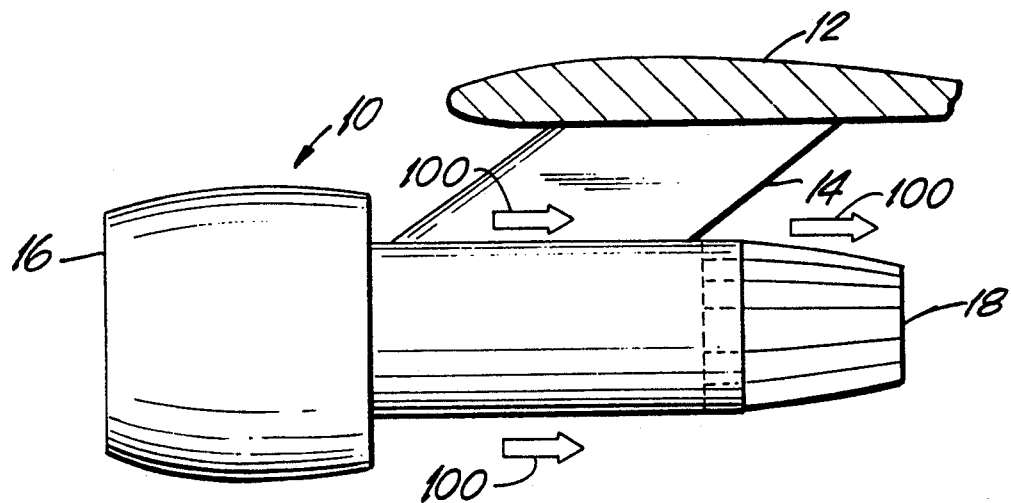
FIG. 1 is an overview of a jet aircraft engine supported from an aircraft wing and employing the present invention.

Referring now to the drawings, there is shown in FIG. 1 a jet aircraft engine generally designated as 10 which employs the present invention. Engine 10 may be supported by an aircraft structure such as a wing 12 by means of a conventional pylon structure 14. Engine 10 may also be mounted in other convenient locations on an aircraft, e.g. in or attached to the tail structure.

Engine 10 is a gas turbine engine through which air enters at air intake 16 and is heated by burning fuel thereby increasing the volume of air. The combustion discharge gases 102 are passed to the atmosphere through a variable area convergent-divergent exhaust nozzle 18. The combustion discharge gases 102 enter the nozzle at relatively high pressure and low velocity and are accelerated in the convergent area of the exhaust nozzle to sonic speed and are accelerated in the divergent area of the exhaust nozzle to supersonic speed.

Figure 2:
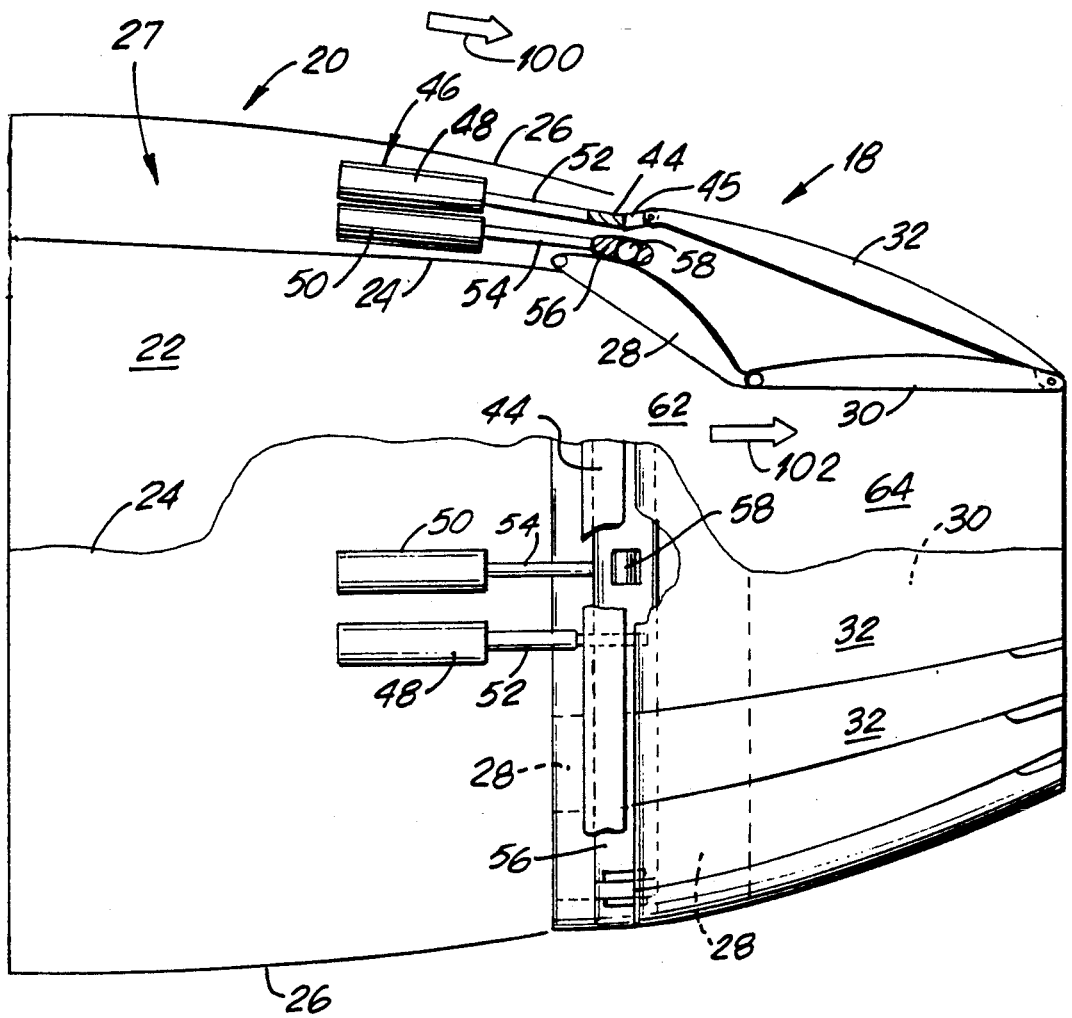
FIG. 2 is a partial fragmentary view of the exhaust nozzle of the engine shown in FIG. 1 showing the positioning of the flaps and actuators.

Referring in addition to FIG. 2, there is shown a partial fragmentary view of the exhaust nozzle 18 connected to exhaust duct 20. Duct 20 consists of a generally cylindrical exhaust pipe 22 surrounded by an outer cylindrical wall 24. Wall 24 is surrounded by a cylindrical outer casing 26 of the engine 10. The annular space 27 between wall 24 and casing 26 houses various engine control mechanisms.

Figure 3:
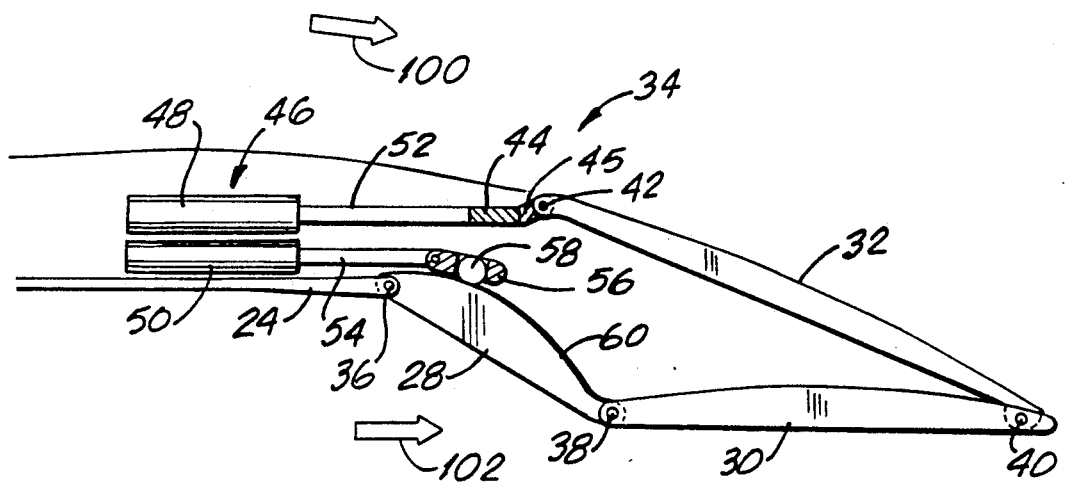
FIG. 3 is a view of a single set of exhaust flaps made in accordance with the principles of the present invention in the normal operating position.

Exhaust nozzle 18 consists of a series of convergent flaps 28, a series of divergent flaps 30, and a series of outer flaps 32, each series of flaps being circumferentially spaced about the nozzle 18. Another way to view the nozzle is to view it as a series of flap sets, each consisting of an interconnected convergent, divergent and outer flap, each set of flaps being circumferentially spaced about the nozzle 18. As shown enlarged in FIG. 3, each flap set 34 consists of a convergent flap 28 connected at its forward end by a pin 36 to wall 24 of the exhaust pipe 22, and connected at its aft end by a pin 38 to the forward end of divergent flap 30. Divergent flap 30 is connected at its aft end by pin 40 to the aft end of outer flap 32. Outer flap 32 is connected by pin 42 at its forward end to an outer flap actuation ring 44 and arm 45. Pin connections 36, 38, 40 and 42 permit the flaps to rotate relative to one another. As shown in FIG. 2, the outer flap actuation ring 44 encircles the convergent flaps 28. Actuation ring 44 is connected to each outer-flap 32 by arm 45 which is rotatably connected to the outer flap by pin 42 (FIG. 3).

Figure 4:
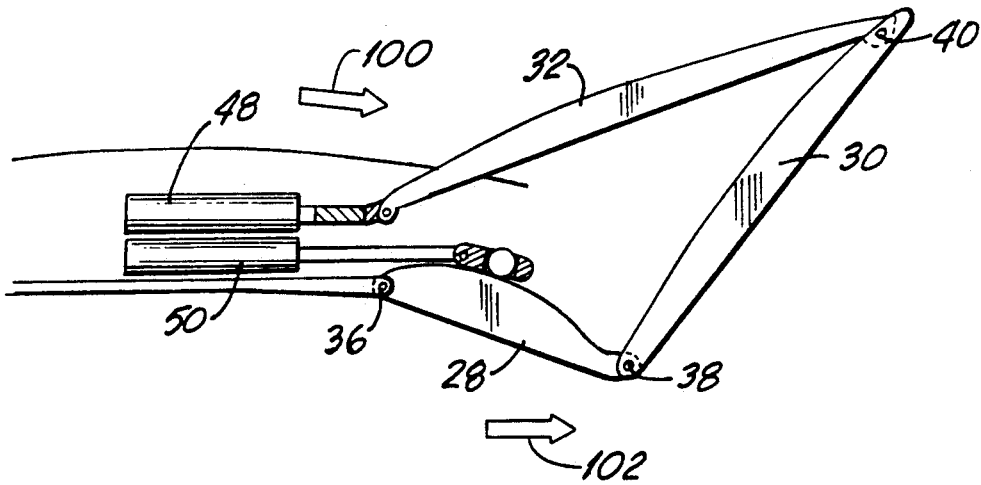
FIG. 4 is another view of the set of exhaust flaps shown in FIG. 3, in the speedbrake position.

An operating mechanism 46 is shown housed in annular space 27 for moving the flaps in a set relative to one another. By way of example, as shown partially in FIG. 2, pistons 48 and pistons 50 are circumferentially spaced about the exhaust pipe 22, and suitably held in place on the engine structure by, for example, bolts (not shown). Piston rods 52 are connected to actuation ring 44. When piston rods 52 are moved to the left and drawn into pistons 48, actuation ring 44 is moved to the left causing arms 45 to move to the left and move outer flaps 32 upward as shown in FIG. 4 and rotate divergent flaps 30 upward about pins 38. The pistons 48 are preferably equally spaced about the circumference of the exhaust pipe 22 so as to provide a uniform force on ring 44 when the pistons 48 are activated.

Piston rods 54 are shown connected to a convergent flap actuation ring 56 which houses rollers 58, each of which rides on a cam surface 60 which is the upper surface of each convergent flap 28. As shown in FIG. 2, the convergent flap actuation ring 56 encircles the convergent flaps 28. As will be more fully described, actuation ring 56 is operatively connected to each convergent flap 28 by rollers 58. The pistons 50 are preferably equally spaced about the circumference of the exhaust pipe 22 so as to provide a uniform force on ring 56 when the pistons 50 are activated. As will be described more fully, movement of piston rods 54 causes convergent flaps 28 to move up and down, also causing divergent flaps 30 and outer flaps 32 to move.

When the gas turbine engine 10, which is used to describe the invention, is operated, the combustion discharge gases exert pressure on the convergent flaps 28 urging them outward into contact with rollers 58. Rollers 58 limit the outward movement of the convergent flaps. The convergent flaps 28 are a major engine control and are moved whenever there is an increase or decrease in engine power to control the minimum or choke area of the exhaust nozzle, which is at the aft end of the convergent flaps. Accordingly, the convergent flaps 28 and its associated choke area controls the backpressure on the turbine and hence the rpm, thrust, and exhaust gas temperature. When engine power is, for example, increased, piston rods 54 extend outward from pistons 50 and move convergent flap actuation ring 56 aft, causing rollers 58 to move to the right which due to the profile of the cam surfaces 60 open the convergent flaps 28 to increase the choke area a suitable amount for the increased volume of the combustion gas stream. The outward movement of the convergent flaps causes divergent flaps 30 to also move outwardly. The outward movement of the divergent flaps 30 results from the convergent, divergent and outer flaps, together with the fixed forward end of the convergent flap at pin 36 and the fixed forward end of the outer flap at pin 42, forming a four-bar linkage. The choke point at the aft end of the convergent flaps is maintained as the minimum diameter of the nozzle through choosing an appropriately shaped cam surface, and lengths of the convergent and divergent flaps, since the convergent/divergent flap ratio kinematically follows the cam surface profile. The outer flaps 32 as part of the four-bar linkage will also move. However, the outflap movement is minimal and the outer flaps remain an airframe extension and do not cause unnecessary drag on the aircraft during convergent flap movement.

The array of circumferentially spaced convergent flaps 28 forms a convergent duct 62 in the exhaust nozzle. The combustion exhaust gases 102 are subjected to sufficient pressure at the entrance to the convergent duct 62 so that the change in velocity through the convergent duct is enough to cause sonic velocity at the choke point. The array of circumferentially spaced divergent flaps 30 forms a divergent duct 64 in the exhaust nozzle. In the divergent duct, the exhaust gases 102 expand outwardly and increase to supersonic velocity.

Figure 5:
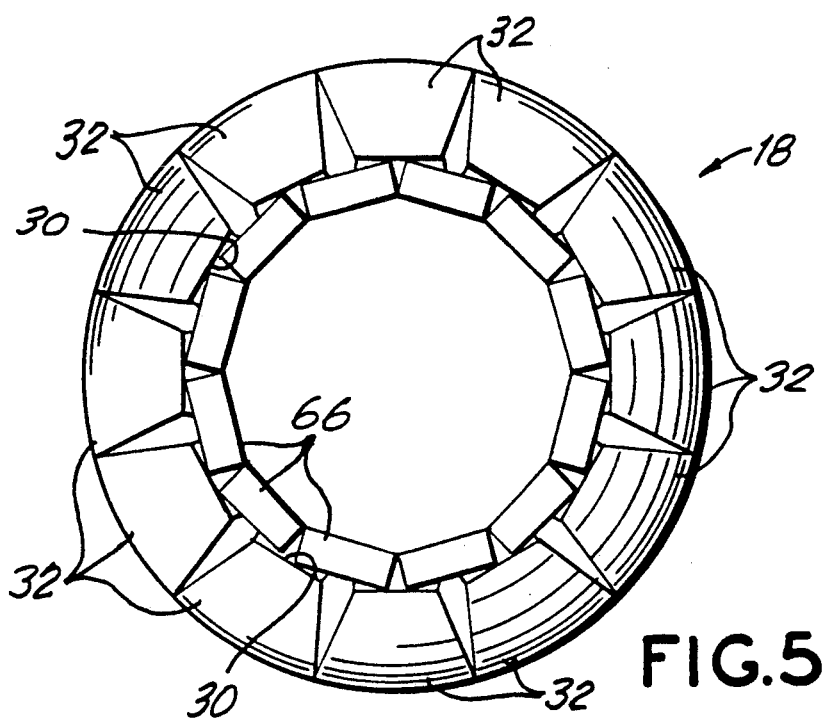
FIG. 5 is an end view of the engine showing the exhaust flaps in the normal operating position.
Figure 6:
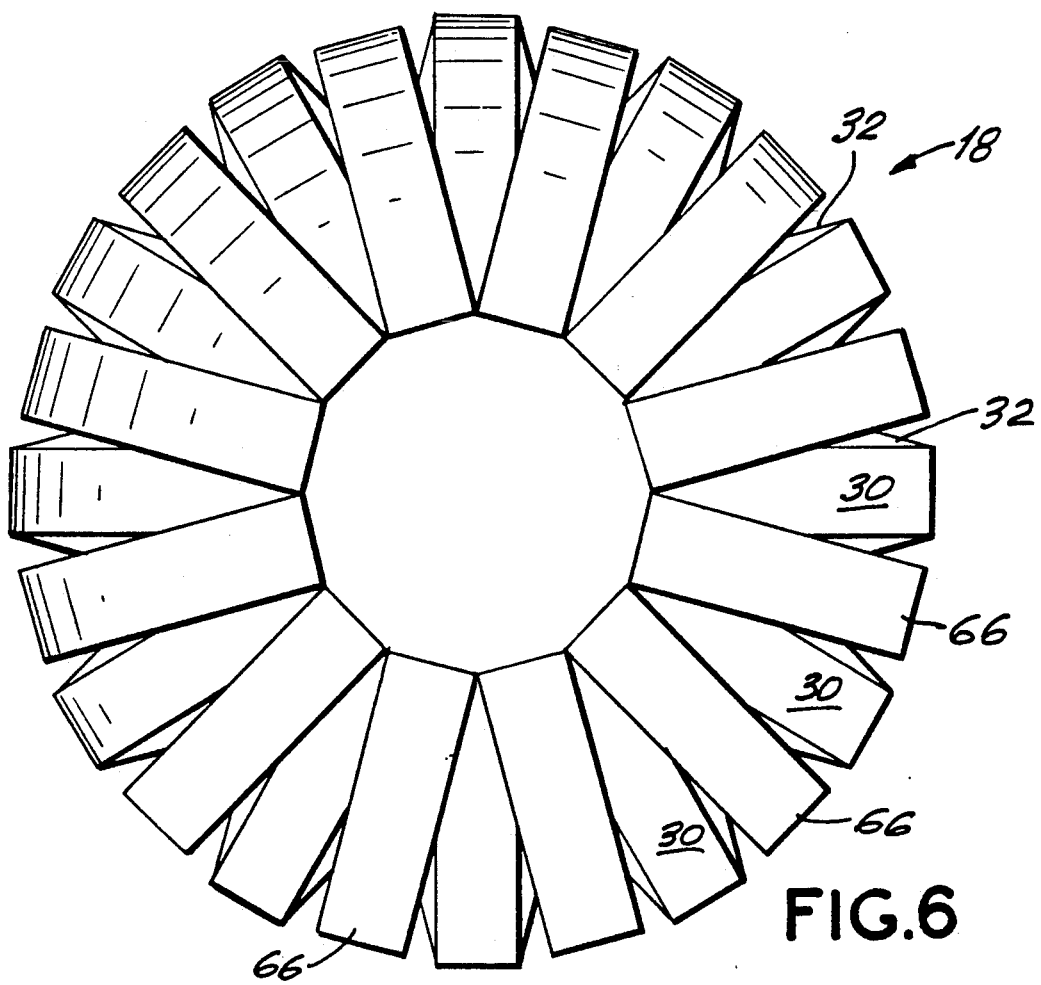
FIG. 6 is an end view of the engine showing the exhaust flaps in the speedbrake position.

FIG. 5 shows an end view of nozzle 18 with outer flaps 32 in the normal operating position. Divergent flaps 30 are shown with divergent seals 66 in effect making the divergent duct 64 air tight. In addition, the convergent flaps have convergent seals (not shown) which in effect make the convergent duct air tight. FIG. 6 shows an end view of nozzle 18 with outer flaps 32 in the speedbrake position.

Figure 7:
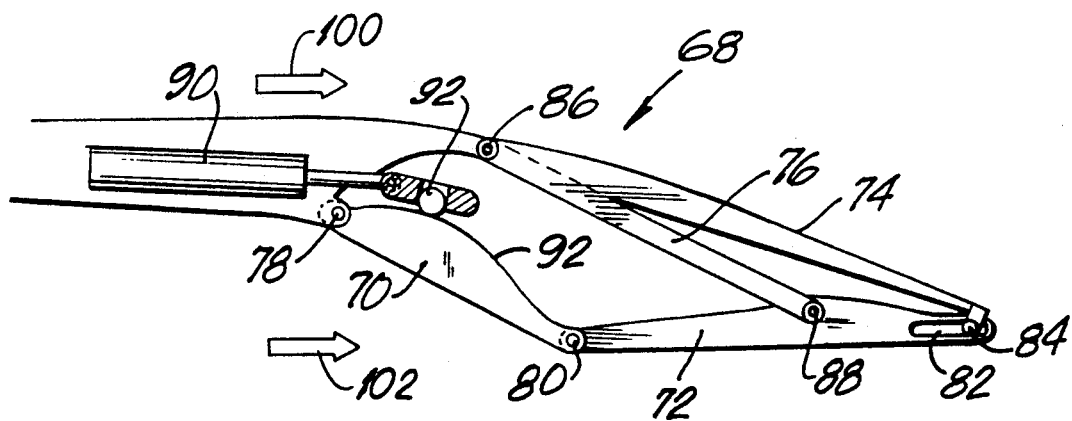
FIG. 7 is a view of a prior art set of exhaust flaps.

A prior art flap set 68 is shown in FIG. 7 with a convergent flap 70, a divergent flap 72, an outer flap 74, and a rigid compression link 76. Convergent flap 70 is rotatably connected at its forward end by pin 78 to the engine structure. Convergent flap 70 is rotatably connected at its aft end by pin 80 to the forward end of divergent flap 72. The aft end of the divergent flap 72 has an elongated slot in which pin 84 connected to the aft end of outer flap 74 rides. Slot 82 permits both rotation and translation of the outer flap and the divergent flap relative to one another. Outer flap 74 is rotatably connected at its forward end by pin 86 to the engine structure. Compression link 76 is also rotatably connected to the engine structure by pin 86 and to divergent flap 72 by pin 88. Piston 90 operates divergent flap 70 through roller 92 riding on cam surface 92 of the convergent flap as described with respect to the present invention. However, the four-bar linkage of the prior art formed by the flaps and the compression link does not permit the outer flap 74 to move outward into the airstream and serve as a speedbrake.

In order to activate the speedbrakes to either slow down the aircraft or perform an inflight maneuver, pistons 48 are operated to draw piston rods 52 into pistons 48 and move ring 44 to the left and thereby move outer flaps 32 into the airstream 100 to create drag on aircraft. As flaps 32 are moved outward, divergent flaps 30 are also rotated outward causing the expanding gases 102 in the divergent duct to detach from the divergent flaps and go almost immediately to ambient pressure thereby spoiling the thrust. Accordingly, activation of the speedbrakes both causes drag on the aircraft and spoils the thrust to quickly slow down the aircraft. Since the exhaust gases are at sonic speed at the choke point, the engine forward of the choke point maintains its pressure ratios and rpm. When the speedbrakes are deactivated, by operating pistons 48 to extend piston rods 52 from pistons 48 and move ring 44 to the right, thereby moving the outer flaps 32 to their normal position and divergent flaps 30 to their operative position as shown in FIGS. 3 and 5, the exhaust gases 102 reattach to the divergent flaps causing almost instant thrust at the former level without affecting the engine constants. The ability to almost instantaneously return to former power levels is particularly useful in military aircraft.

While the invention has been described in an embodiment using a gas turbine engine with a variable area convergent-divergent exhaust nozzle, the invention is equally applicable to other types of jet engines as well as other types of exhaust nozzles. If the invention is used in either a fixed or variable area convergent nozzle, movement of the outerflaps into the airstream would still act as speedbrakes. However, movement of the convergent flaps outwardly will be used to simultaneously spoil the thrust. Since the thrust is being spoiled forward of the choke point in this embodiment, the engine constants will be affected and the power may require adjustment. When the speedbrakes are deactivated, the convergent flaps will return to their normal operating position, but there will not be an instant return to full power.

There has been described a preferred and alternate embodiment of the invention. However, it should be understood that various changes and modifications may be made thereto without departing from the spirit and scope of the invention.

What is claimed is:

1. In a jet engine having a variable area convergent-divergent exhaust nozzle with an internal flowpath for gases providing thrust and an external surface to partially define an airstream external to the exhaust nozzle, speedbrakes comprising:
   at least one outer exhaust nozzle flap having a forward end and an aft end, said outer flap normally positioned to be substantially out of the airstream during engine operation;
   at least one divergent exhaust nozzle flap having a forward end and an aft end, said aft end of the outerflap being operably connected to the aft end of the divergent flap; and
   means connected to the outer flap forward end for moving the outer flap forward end and for allowing rotation of the outer flap about the outer flap forward end;
   whereby the outer flap extends into the airstream causing the outer flap to act as a speedbrake by substantially increasing drag, said movement of the outer flap into the airstream causing the connected divergent flap to rotate about the divergent flap forward end outwardly to spoil the thrust of the engine.

2. In a jet engine housed within a generally cylindrical outercasing and having a variable area convergent-divergent exhaust nozzle, speedbrakes comprising:
   a plurality of exhaust nozzle flap sets circumferentially spaced about and framing the nozzle, each flap set consisting of an interconnected outer flap, convergent flap and divergent flap, each of said flaps having a forward and an aft end, said convergent flap forward end rotatably coupled to a nozzle wall and said convergent flap aft end coupled to said divergent flap forward end, said divergent flap aft end rotatably coupled to said outer flap aft end, and said outer flap forward end rotatably coupled to an outer flap actuation means, said outer flaps being positioned in normal use to lie out of the airstream essentially as a continuation of the outer engine casing;
   said outer flap actuation means capable of extending the outerflaps into the airstream to act as speed brakes by substantially increasing drag.

3. Speedbrakes according to claim 2, wherein said outer flap actuation means for extending the outerflaps to act as speedbrakes also causes the divergent flaps to open outwardly to simultaneously spoil the thrust of the engine.

4. Speedbrakes according to claim 3, wherein said outer flap actuation means includes an actuation ring connected to the forward end of each outer flap.

5. Speedbrakes according to claim 4, wherein the movement of the divergent flaps during speedbrake operation is such that the choke point of the engine is maintained forward of the divergent flaps.

6. In a gas turbine engine having an exhaust nozzle, an internal axial airflow passage for causing air exiting the internal passage of said exhaust nozzle to provide thrust, and exhaust nozzle outer flaps for defining a portion of an airstream flowpath external to the engine, the improvement comprising an exhaust nozzle including:
- a first, outer, flap with a forward end and an aft end, adapted for deployment into the airstream external to the engine to substantially increase drag;
- a second flap with a forward end and an aft end, and an inner, flow defining surface, defining part of the axial airflow flowpath through the exhaust nozzle, operatively connected to the aft end of the first flap such that in response to deployment of the first flap into the airstream the aft end of the second flap moves radially outward to spoil the thrust of the axial airflow; and
- means coupled to the forward end of the first flap for deploying the first flap into the airstream.

7. An exhaust nozzle according to claim 6 wherein the second flap is a divergent flap.

8. An exhaust nozzle according to claim 7 wherein the divergent flap has a forward end and an aft end, the forward end operatively connected to a convergent flap and the aft end operatively connected to the outer flap such that in response to deployment of the outer flap the aft end of the divergent flap moves radially outward to spoil the thrust of the axial airflow as said airflow becomes detached from said flow defining surface.

* * * * *